United States Patent
Oh et al.

(10) Patent No.: US 6,931,654 B1
(45) Date of Patent: Aug. 16, 2005

(54) HYBRID DISC AND METHOD AND APPARATUS FOR DISCRIMINATING SAME

(75) Inventors: Young-Nam Oh, Kyungki-do (KR); Jae-Hoon Heo, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 09/556,978

(22) Filed: Apr. 24, 2000

Related U.S. Application Data

(62) Division of application No. 09/055,711, filed on Apr. 7, 1998.

(30) Foreign Application Priority Data

Aug. 30, 1997 (KR) .............................................. 97-43774

(51) Int. Cl.[7] .............................................. G11B 11/00
(52) U.S. Cl. ..................... 720/718; 369/13.02; 369/286
(58) Field of Search ................................. 369/283, 286, 369/13.02, 272, 292; 720/718

(56) References Cited

U.S. PATENT DOCUMENTS

| | | | | |
|---|---|---|---|---|
| 5,526,328 A | | 6/1996 | Oshima et al. ............... 369/13 |
| 5,694,381 A | * | 12/1997 | Sako ............................ 369/58 |
| 5,896,355 A | * | 4/1999 | Sato et al. .................... 369/58 |
| 5,959,946 A | * | 9/1999 | Tognazzini ................... 369/32 |
| 6,307,824 B1 | * | 10/2001 | Kuroda et al. ........... 369/53.11 |
| 6,320,840 B1 | * | 11/2001 | Oh et al. .................... 369/286 |
| 6,587,424 B2 | * | 7/2003 | Kuroda et al. ........... 369/275.2 |

* cited by examiner

Primary Examiner—Brian E. Miller
(74) Attorney, Agent, or Firm—Staas & Halsey LLP

(57) ABSTRACT

A DVD playback apparatus accurately discriminates a hybrid disc, to prevent a recordable CD installed therein from being damaged by a laser beam for a DVD/MMCD. The hybrid disc includes a label printed surface formed on a substrate, a CD recording surface formed below the label printed surface, having identification information expressing a disc type, and a DVD recording surface formed below the CD recording surface. The DVD playback apparatus irradiates a CD laser beam on an optical disk installed therein. If data is readable from the optical disc, it is checked whether the identification information is recorded in the predetermined recording area. The DVD playback apparatus recognizes the optical disc as the hybrid disc, if the identification information is recorded in the predetermined recording area.

3 Claims, 3 Drawing Sheets

HYBRID DISC AND METHOD AND APPARATUS FOR DISCRIMINATING SAME

This application is a Division of Ser. No. 09/055,711 filed Apr. 7, 1998.

BACKGROUND OF THE INVENTION

1. Field of the Invention

The present invention relates to an optical disc playback apparatus, and more particularly, to an improved hybrid disc and a method and an apparatus for discriminating the same.

2. Description of the Related Art

A digital versatile disk (hereinafter, called "DVD" for short) playback apparatus can playback both a CD (compact disk) and a DVD. Thus, the DVD playback apparatus has a function of discriminating a type of the disc installed therein, to set a proper playback mode according to the disc type.

In discriminating the disc type, the DVD playback apparatus checks whether an installed disc is a DVD or a CD upon installation of the disc, and sets a proper playback mode according to the detected disc type. More specifically, upon installation of the disc, the DVD playback apparatus irradiates a laser beam for DVD/MMCD (Digital Versatile Disk/Multimedia CD) (hereinafter, referred to as a "DVD/MMCD laser beam" for short) having a wavelength of 650 nm on the surface of the disc, to read data recorded thereon. At this moment, if the data recorded on the disc is readable, the DVD playback apparatus recognizes the installed disc as a DVD and begins to read and playback the data recorded on the DVD. On the contrary, however, if the data recorded on the installed disc is unreadable, the DVD playback apparatus irradiates a laser beam for CD (hereinafter, referred to as a "CD laser beam" for short) having a wavelength of 780 nm on the surface of the disc to read the data recorded on the installed disc. If the data recorded on the disc is readable, the DVD playback apparatus recognizes the installed disc as a CD, and begins to read and playback the data recorded thereon.

However, unlike a general CD (i.e., read-only CD), a recordable CD may be damaged undesirably, when exposed to the DVD/MMCD laser beam with a wavelength of 650 nm. To prevent the recordable CD from being damaged by the DVD/MMCD laser beam, an improved DVD playback apparatus first checks whether the installed disc is a CD or not and thereafter, checks whether the installed disc is a DVD, if it is not the CD.

With an increasing demand for a multipurpose optical recording medium, a hybrid disc has been proposed which is compatible with both a CD playback apparatus and the DVD playback apparatus. Such a hybrid disc is applicable to a CD-ROM/DVD-ROM, a video-CD/DVD-video drive, a CD-DA (digital audio)/DVD-audio device, etc.

Referring to FIG. 1, the hybrid disc includes a polycarbonate substrate having a diameter of 12 cm and a thickness of 1.2 mm. The hybrid disc includes a CD recording surface B positioned about 5 μm below a label printed surface A, and a DVD/MMCD recording surface C positioned about 0.6 mm below the label printed surface A. The CD recording surface B has a reflection factor of about 70%, and the DVD/MMCD recording surface C has a reflection factor of about 30%. As a combined CD and DVD recording medium, the hybrid disc is recognizable as a CD in the CD playback apparatus, and as a DVD in the DVD playback apparatus. CD data is recorded on the CD recording surface B, and DVD data is recorded on the DVD/MMCD recording surface C.

Therefore, the CD playback apparatus irradiates the CD laser beam on the hybrid disc, to read data recorded on the CD recording surface B, and the DVD playback apparatus irradiates the DVD/MMCD laser beam on the hybrid disc, to read data recorded on the DVD/MMCD recording surface C.

However, in the case that the DVD playback apparatus first checks whether the installed disc is a CD or not as mentioned above, to prevent the CD from being damaged in the course of discriminating the disc type, the DVD playback apparatus may mis-recognize the hybrid disc as a CD by reading the data recorded on the CD recording surface B of the hybrid disc.

SUMMARY OF THE INVENTION

It is therefore an object of the present invention to provide an improved hybrid disc and a method for accurately discriminating a hybrid disc, to thereby prevent a recordable CD from being damaged by a laser beam for a DVD/MMCD.

Additional objects and advantages of the invention will be set forth in part in the description which follows and, in part, will be obvious from the description, or may be learned by practice of the invention.

To achieve the above and other objects, a hybrid disc includes a substrate; a label printed surface formed on the substrate; a CD recording surface formed below the label printed surface, having identification information expressing a disc type recorded in a predetermined recording area; and a DVD recording surface formed below the CD recording surface.

Further, a method for discriminating the hybrid disc in a DVD playback apparatus includes the steps of irradiating a CD laser beam on an optical disk installed in the DVD playback apparatus; if data is readable from the optical disc, checking whether the identification information is recorded in the predetermined recording area; and recognizing the optical disc as the hybrid disc, if the identification information is recorded in the predetermined recording area.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

A preferred embodiment of the present invention will be described in detail referring to the attached drawings. Though the specific embodiment such as the detailed flow chart will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 1:
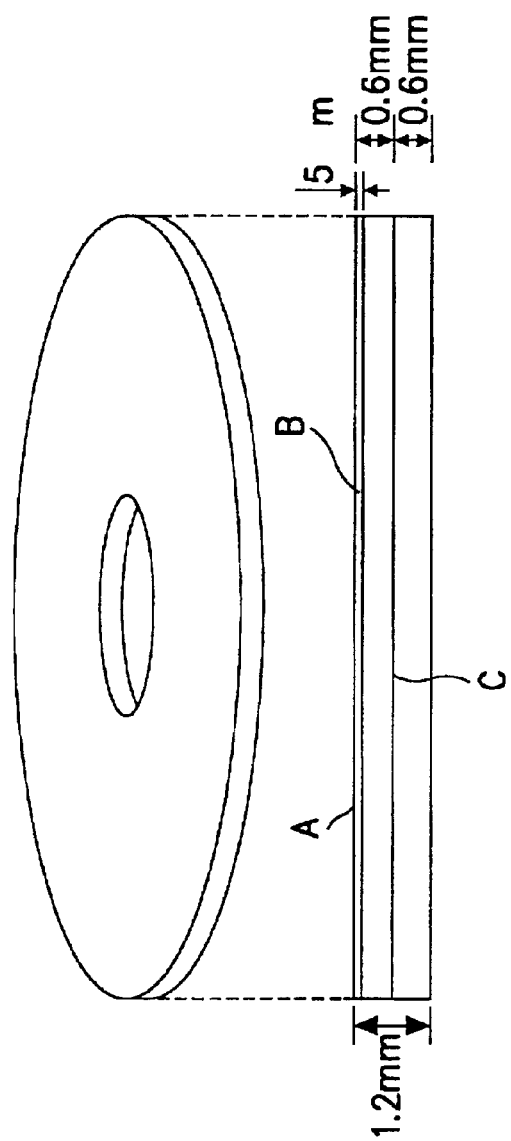
FIG. 1 illustrates a known hybrid disc.

A hybrid disc according to a preferred embodiment of the present invention has identification information expressing a disc type, which are recorded on a particular recording area such as a file which is generally not used, a sector which is predetermined, or a TOC (table of contents) in a CD recording surface B of FIG. 1. The identification information is utilized when a DVD playback apparatus discriminates the disc type.

Figure 2:
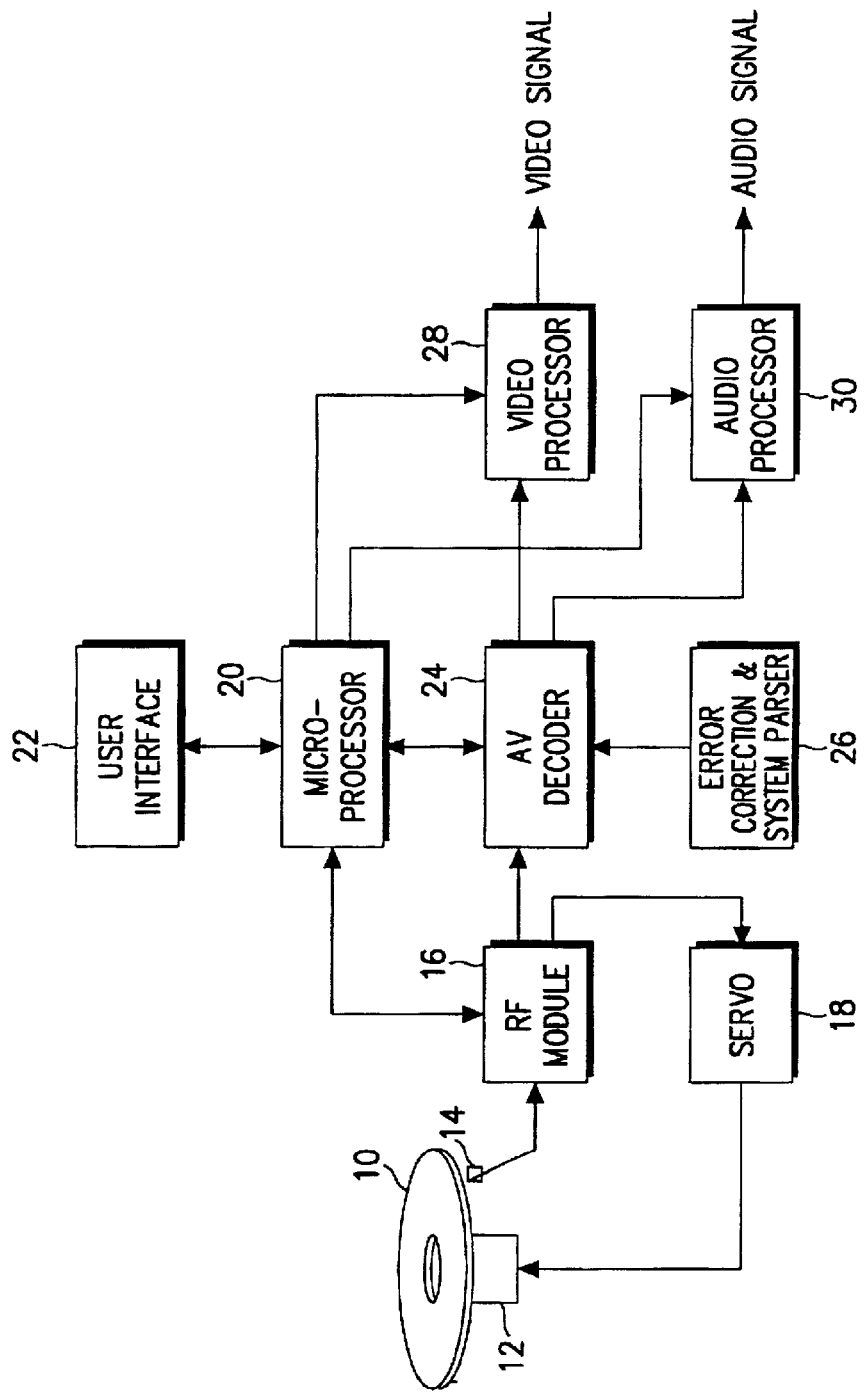
FIG. 2 is a schematic block diagram of a DVD playback apparatus to which the present invention is applicable.

FIG. 2 shows a block diagram of a DVD playback apparatus to which the present invention is applicable. As illustrated in the drawing, an optical disc 10 is revolved by a spindle motor 12. An optical pickup 14 irradiates a CD laser beam with a wavelength of 780 nm or a DVD/MMCD laser beam with a wavelength of 650 nm on a surface of the revolving optical disc 10 under the control of a microprocessor 20, to read data recorded on the optical disc 10. The read data is amplified and reshaped at an RF (radio frequency) module 16. A servo 18 controls the spindle motor 12 and the optical pickup 14 according to servo information received from the RF module 16.

The data output from the RF module 16 is processed by an error correction and system parser 26, and decoded by an AV (audio-visual) decoder 24. Video data and audio data of the decoded data are converted into a video signal and an audio signal by a video processor 28 and an audio processor 30, respectively. A microprocessor 20 controls an overall operation of the DVD playback apparatus. A user interface 22 allows a use to input various control commands and displays various information thereon under the control of the microprocessor 20.

Figure 3:
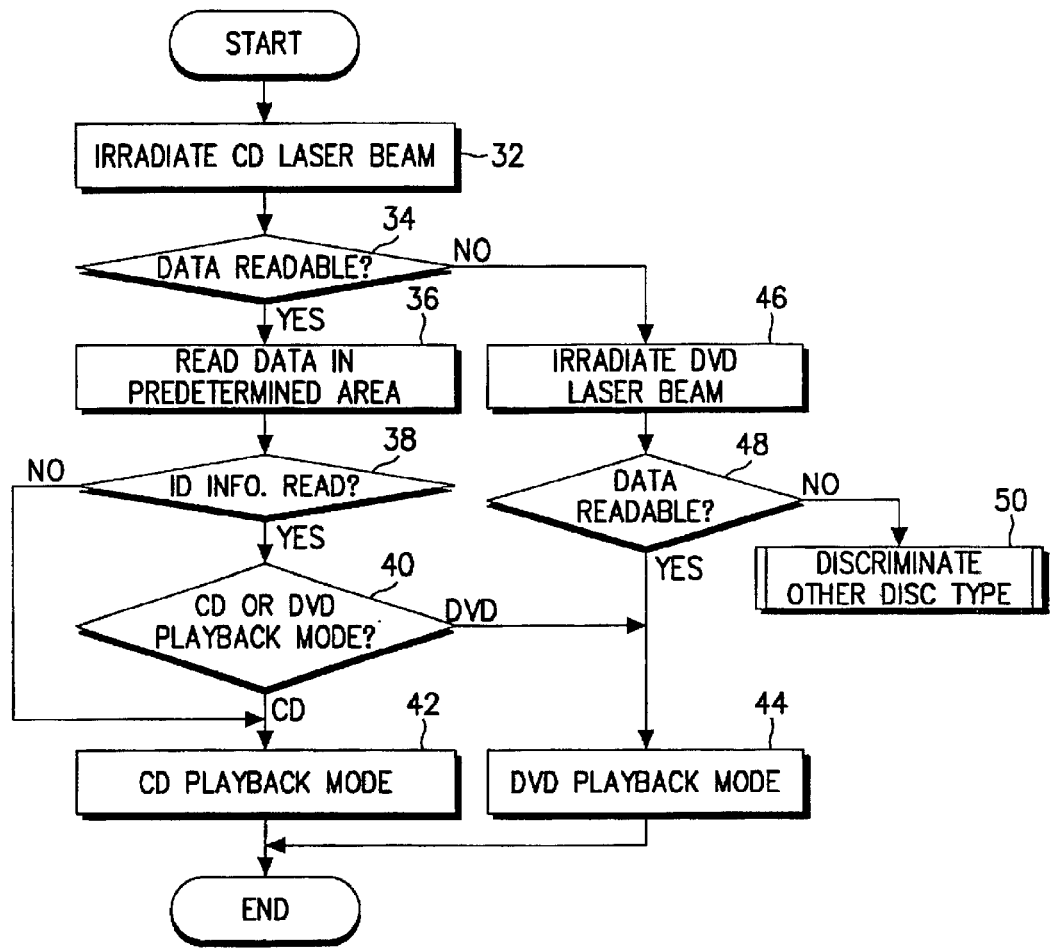
FIG. 3 is a flow chart for discriminating a hybrid disc according to an embodiment of the present invention.

Now, a procedure for discriminating the disc according to the present invention will be described in detail with reference to FIGS. 2 and 3.

If the optical disc 10 is installed in the DVD playback apparatus of FIG. 2, the optical pickup 14 irradiates the CD laser beam with a wavelength of 780 nm on the surface of the optical disk 10 under the control of the microprocessor 20, at a step 32. Here, if the optical disc 10 is a hybrid disc, the optical pickup 14 reads the data recorded on the CD recording surface B; otherwise, if the optical disc 10 is a CD (i.e., read/only CD) or a recordable CD, the optical pickup 14 reads the data recorded on the CD or the recordable CD under the control of the microprocessor 20.

Then, the microprocessor 20 checks at a step 34 whether the data recorded on the installed optical disc 10 is readable or not. If the data is readable, the optical pickup 14 reads data recorded on a predetermined area of the installed optical disc 10 under the control of the microprocessor 20, at a step 36. It should be noted that the hybrid disc has the identification information recorded on the predetermined area, while the CD or recordable CD does not have the identification information recorded thereon.

At a step 38, the microprocessor 20 checks whether the data read from the predetermined area is the identification information expressing the hybrid disc. As a result, if the read data is the identification data, the microprocessor 20 recognizes the installed optical disc 10 as a hybrid disc, and goes to a step 40. However, if the read data is not the identification data, the microprocessor 20 recognizes the installed optical disc 10 as a CD or a recordable CD, and goes to a step 42.

Then, the user interface 22 displays thereon a message expressing that the installed optical disc 10 is a hybrid disc and the user should select one of a CD playback mode or a DVD playback mode, under the control of the microprocessor 20. In reply to the message, the user will select at a step 40 one of the two playback modes by way of the user interface 22. If the user selects the CD playback mode, the procedure goes to a step 42 to perform the CD playback mode. On the contrary, if the user selects the DVD playback mode, the procedure goes to a step 44 to perform the DVD playback mode.

If the data recorded on the installed optical disc 10 is unreadable at the step 34, the optical pickup 14 will irradiate the DVD/MMCD laser beam with a wavelength of 650 nm on the installed optical disc 10 under the control of the microprocessor 20. Here, if the installed optical disc 10 is a DVD, the DVD playback apparatus can read the data. However, if the installed disc 10 is a different type of the disc such as MD (mini disc) and MOD (magneto optical disc), the DVD playback apparatus can not read the data.

The microprocessor 20 checks at a step 48 whether the data is readable or not. If the data is readable, the microprocessor 20 recognizes the installed optical disc 10 as a DVD and sets the DVD playback mode at a step 44. If the data is unreadable, it is considered that the installed disc is neither a CD nor a DVD. Thus, the DVD playback apparatus performs a procedure for discriminating other disc types, at a step 50.

In summary, in the case that a recordable CD is installed, the DVD playback apparatus irradiates the CD laser beam with a wavelength of 780 nm on the recordable CD. If the data is readable, the DVD playback apparatus reads the data recorded on the predetermined recording area. Since the recordable CD does not have the identification information on the predetermined recording area, the DVD playback apparatus recognizes the recordable CD as a general CD (i.e., read-only CD), and sets the CD playback mode. That is, the DVD playback apparatus does not irradiate the DVD/MMCD laser beam with a wavelength of 650 nm on the surface of the recordable CD, so that the recordable CD may not be damaged.

Further, in the case that the hybrid disc is installed, the DVD playback apparatus irradiates the CD laser beam. If the data is readable, the DVD playback apparatus reads the identification information recorded on the predetermined recording area of the hybrid disc. As the result, the DVD playback apparatus recognizes the installed CD as a hybrid disc, and displays on the user interface 22 a message expressing that the user should select one of the CD playback mode and the DVD playback mode. Then, the DVD playback apparatus will be set to one of the CD playback mode and the DVD playback mode according to the user's selection. Of course, the DVD playback apparatus may automatically select one of the two operation modes.

Moreover, in the case that the DVD is installed, the DVD playback apparatus irradiates the CD laser beam on the DVD. In this case, since the data is unreadable, the DVD playback apparatus irradiates the DVD/MMCD laser beam on the DVD, to read the data recorded thereon.

As can be clearly understood from the foregoing descriptions, the DVD playback apparatus of the invention can accurately discriminate the hybrid disc and prevent the recordable CD from being damaged by the DVD/MMCD laser beam.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed:

1. A hybrid disc comprising:

a substrate;

a first optical recording surface formed at a first level in said substrate, said first optical recording surface including a first format type of reproduction data; and a second optical recording surface formed at a second level in said substrate, said second optical recording surface including a second format type of reproduction data different from said first type of reproduction data, wherein:

said first and second optical recording surfaces are accessible for recording or reproduction from a same surface of the hybrid disc, and said first optical recording surface further comprises a predetermined recording area having identification information indicating that the hybrid disc is a hybrid disc comprising the first and second optical recording surfaces.

2. The disc as claimed in claim 1, wherein one of said first and second optical recording surfaces is a CD (compact disc) recording surface.

3. The disc as claimed in claim 1, wherein one of said first and second optical surfaces is a DVD (digital versatile disc) recording surface.

* * * * *

UNITED STATES PATENT AND TRADEMARK OFFICE
CERTIFICATE OF CORRECTION

PATENT NO.   : 6,931,654 B1  
DATED        : August 16, 2005  
INVENTOR(S)  : Young-Nam Oh It is certified that error appears in the above-identified patent and that said Letters Patent is hereby corrected as shown below:

Column 6,
Line 5, insert -- recording -- after "optical".

Signed and Sealed this

Twentieth Day of September, 2005

JON W. DUDAS
*Director of the United States Patent and Trademark Office*